(12) United States Patent
Muhle et al.

(10) Patent No.: US 6,870,023 B2
(45) Date of Patent: Mar. 22, 2005

(54) REACTOR WALL COATING AND PROCESSES

(75) Inventors: Michael E. Muhle, Kingwood, TX (US); Porter C. Shannon, Seabrook, TX (US); Fred D. Ehrman, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/651,135

(22) Filed: Aug. 28, 2003

(65) Prior Publication Data

US 2004/0063874 A1 Apr. 1, 2004

Related U.S. Application Data

(60) Provisional application No. 60/414,246, filed on Sep. 27, 2002.

(51) Int. Cl.⁷ .............................. C08F 210/00
(52) U.S. Cl. ................ 526/348; 422/139; 427/230; 427/236; 427/237
(58) Field of Search ............... 526/348; 422/139; 427/230, 236, 237

(56) References Cited

U.S. PATENT DOCUMENTS

| | | | |
|---|---|---|---|
| 4,532,311 A | 7/1985 | Fulks et al. | 526/62 |
| 4,876,320 A | 10/1989 | Fulks et al. | 526/62 |
| 6,335,402 B1 | 1/2002 | Mihan et al. | 526/62 |
| 6,410,474 B1 | 6/2002 | Nowlin et al. | 502/113 |

FOREIGN PATENT DOCUMENTS

| | | | |
|---|---|---|---|
| EP | 0 374 969 | 6/1990 | C08F/2/00 |
| JP | 2000053820 | 2/2000 | C08L/23/08 |
| WO | WO 96/14154 | 5/1996 | B01J/31/00 |
| WO | WO97/49771 | * 12/1997 | |
| WO | WO 97/49771 | 12/1997 | C09D/5/16 |

OTHER PUBLICATIONS

Abstract of FR 1151941.

* cited by examiner

Primary Examiner—William K. Cheung
(74) Attorney, Agent, or Firm—Andrew B. Griffis; Maria C. Walsh (57) ABSTRACT

Reactor wall coatings for polymerization reactors and processes for forming such coatings are disclosed. The reactor wall coatings can have a thickness of at least 100 μm and a molecular weight distribution including a major peak having one or more of an Mw/Mn ratio of less than 10; an Mz/Mw ratio of less than 7; and a maximum value of d(wt %)/d(log MW) at less than 25,000 daltons in a plot of d(wt %)/d(log MW), where MW is the molecular weight in daltons. The reactor wall coatings can be formed in-situ during polymerization, on reactor walls initially free of a reactor wall coating, or having a pre-existing reactor wall coating.

24 Claims, 4 Drawing Sheets

REACTOR WALL COATING AND PROCESSES

1. CROSS-REFERENCE TO RELATED APPLICATIONS

The present application claims the benefit of U.S. Provisional Application No. 60/414,246, filed Sep. 27, 2002, said application hereby incorporated by reference.

2. FIELD OF THE INVENTION

The invention relates generally to wall coatings for improved performance in polymerization reactors, and related methods. More particularly, the invention provides reactor wall coatings for fluidized bed and slurry loop reactors, and methods of forming such reactor wall coatings.

3. BACKGROUND

Gas phase and slurry processes for the homopolymerization and copolymerization of monomers, especially olefin monomers, are well known in the art. Such processes can be conducted in the gas phase, for example, in a stirred tank or fluidized bed reactor, or in a slurry in a slurry loop reactor. In any of these reactors, particularly in continuous, commercial-scale operation in a fluidized bed reactor, the presence of a thin polymeric coating on the interior surface of the reactor walls, i.e., the surfaces in contact with the polymerization medium, is desirable. Without wishing to be bound by theory, it is believed that the presence of a reactor wall coating inhibits formation of localized areas of electrostatic charge accumulation on the reactor wall surface, a phenomenon that is believed to contribute to the formation of "sheets" of fused resin particles. Sheeting rapidly plugs product discharge systems and/or disrupts fluidization, leading to the need for costly and time-consuming reactor shut-downs.

It is known in the art that reactor wall coatings formed with the aid of certain chromium compounds are particularly effective in reducing charge buildup on reactor walls and impeding sheet formation. U.S. Pat. Nos. 4,532,311 and 4,876,320, for example, disclose methods of reducing sheeting in a fluidized bed reactor by introducing into the reactor a chromium compound, such as a Cr(II) or Cr(III) compound, into the reactor prior to polymerization. The chromium compound can be dissolved in an inert solvent and introduced into the reactor by a pressurized inert gas.

A particular class of useful chromium compounds are chromocenes, such as bis-cyclopentadienyl chromium. Chromocene treatment systems are commonly used to provide reactor wall coatings. Generally, the reactor must be thoroughly cleaned, typically by abrasive such as sandblasting; subjected to the chromocene treatment; and re-cleaned to remove debris resulting from the treatment. Such treatments, however, require reactor downtimes of typically eight to fourteen days or longer. It has long been desired to develop an alternative method of forming a reactor wall coating that would reduce or eliminate the amount of costly reactor downtime needed to form the coating. It would also be desirable to have reactor wall coatings that further decrease the tendency to form sheets in the reactor during polymerization.

4. SUMMARY OF THE INVENTION

It has been surprisingly found that reactor wall coatings can be formed on a reactor wall without the need for chromocene treatment and its associated costly downtime. It has further been surprisingly found that reactor wall coatings of the present invention display superior properties believed to contribute to improved reactor performance, such as increased coating thickness and higher charge holding potential, compared to reactor wall coatings formed from operation with conventional metallocene catalysts or Ziegler-Natta catalysts, or formed with conventional chromocene treatment.

In one embodiment, the present invention provides a reactor wall coating in a polymerization reactor, the coating having a thickness of at least 100 μm and a molecular weight distribution including a major peak having at least one of:
  (a) an Mw/Mn ratio of less than 10;
  (b) an Mz/Mw ratio of less than 7, and
  (c) a maximum value of d(wt %)/d(log MW) at less than 25,000 daltons in a plot of d(wt %)/d(log MW), where MW is the molecular weight in daltons.

In another embodiment, the present invention provides a reactor wall coating in a polymerization reactor, the coating having a thickness of at least 100 μm and a molecular weight distribution including a major peak having at least two of:
  (a) an Mw/Mn ratio of less than 10;
  (b) an Mz/Mw ratio of less than 7, and
  (c) a maximum value of d(wt %)/d(log MW) at less than 25,000 daltons in a plot of d(wt %)/d(log MW), where MW is the molecular weight in daltons.

In another embodiment, the present invention provides a reactor wall coating in a polymerization reactor, the coating having a thickness of at least 100 μm and a molecular weight distribution including a
  (a) an Mw/Mn ratio of less than 10;
  (b) an Mz/Mw ratio of less than 7, and
  (c) a maximum value of d(wt %)/d(log MW) at less than 25,000 daltons in a plot of d(wt %)/d(log MW), where MW is the molecular weight in daltons.

In another embodiment, the invention provides a reactor wall coating according to any of the preceding embodiments, and wherein the polymerization reactor is a fluidized bed reactor.

In another embodiment, the invention provides a reactor wall coating according to any of the preceding embodiments, except that the thickness is at least 125 μm.

In another embodiment, the invention provides a reactor wall coating according to any of the preceding embodiments, except that the thickness is at least 150 μm.

In another embodiment, the invention provides a reactor wall coating according to any of the preceding embodiments, except that the thickness is at least 170 μm.

In another embodiment, the invention provides a reactor wall coating according to any of the preceding embodiments, except that the Mw/Mn ratio is less than 8.

In another embodiment, the invention provides a reactor wall coating according to any of the preceding embodiments, except that the Mw/Mn ratio is less than 6.

In another embodiment, the invention provides a reactor wall coating according to any of the preceding embodiments, except that the Mw/Mn ratio is less than 4.

In another embodiment, the invention provides a reactor wall coating according to any of the preceding embodiments, except that the Mz/Mw ratio is less than 6.

In another embodiment, the invention provides a reactor wall coating according to any of the preceding embodiments, except that the Mz/Mw ratio is less than 5.

In another embodiment, the invention provides a reactor wall coating according to any of the preceding embodiments, except that the Mz/Mw ratio is less than 4.

In another embodiment, the invention provides a reactor wall coating according to any of the preceding embodiments, except that the maximum value of d(wt %)/d(log MW) is at less than 20,000 daltons.

In another embodiment, the invention provides a reactor wall coating according to any of the preceding embodiments, except that the maximum value of d(wt %)/d(log MW) is at less than 15,000 daltons.

In another embodiment, the invention provides a reactor wall coating according to any of the preceding embodiments, except that the maximum value of d(wt %)/d(log MW) is at less than 13,000 daltons.

In another embodiment, the invention provides a reactor wall coating according to any of the preceding embodiments, and wherein the major peak has an Mn value of less than 7000.

In another embodiment, the invention provides a reactor wall coating according to any of the preceding embodiments, and wherein the major peak has an Mn value of less than 6000.

In another embodiment, the invention provides a reactor wall coating according to any of the preceding embodiments, and wherein the coating has an initial voltage potential $V_0$ of at least 400 V, where $V_0$ is the absolute value of the voltage potential measured immediately after application of a charging voltage potential of 9 kV for a period of 20 ms.

In another embodiment, the invention provides a reactor wall coating according to any of the preceding embodiments, and wherein the coating has an initial voltage potential $V_0$ of at least 600 V, where $V_0$ is the absolute value of the voltage potential measured immediately after application of a charging voltage potential of 9 kV for a period of 20 ms.

In another embodiment, the invention provides a reactor wall coating according to any of the preceding embodiments, and wherein the coating has an initial voltage potential $V_0$ of at least 800 V, where $V_0$ is the absolute value of the voltage potential measured immediately after application of a charging voltage potential of 9 kV for a period of 20 ms.

In another embodiment, the invention provides a reactor wall coating according to any of the preceding embodiments, and wherein the coating has an initial voltage potential $V_0$ of at least 1000 V, where $V_0$ is the absolute value of the voltage potential measured immediately after application of a charging voltage potential of 9 kV for a period of 20 ms.

In another embodiment, the invention provides a reactor wall coating according to any of the preceding embodiments, and wherein the coating has an initial voltage potential $V_0$, where $V_0$ is the absolute value of the voltage potential measured immediately after application of a charging voltage potential of 9 kV for a period of 20 ms, and a voltage retention value $V_{60}$ of at least $0.8V_0$, where $V_{60}$ is the absolute value of the voltage potential measured 60 s after application of the charging voltage potential.

In another embodiment, the invention provides a reactor wall coating according to any of the preceding embodiments, and wherein the coating has an initial voltage potential $V_0$, where $V_0$ is the absolute value of the voltage potential measured immediately after application of a charging voltage potential of 9 kV for a period of 20 ms, and a voltage retention value $V_{60}$ of at least $0.9V_0$, where $V_{60}$ is the absolute value of the voltage potential measured 60 s after application of the charging voltage potential.

In another embodiment, the invention provides a reactor wall coating according to any of the preceding embodiments, and wherein the coating has an initial voltage potential $V_0$, where $V_0$ is the absolute value of the voltage potential measured immediately after application of a charging voltage potential of 9 kV for a period of 20 ms, and a voltage retention value $V_{120}$ of at least $0.75V_0$, where $V_{120}$ is the absolute value of the voltage potential measured 120 s after application of the charging voltage potential.

In another embodiment, the invention provides a reactor wall coating according to any of the preceding embodiments, and wherein the coating has an initial voltage potential $V_0$, where $V_0$ is the absolute value of the voltage potential measured immediately after application of a charging voltage potential of 9 kV for a period of 20 ms, and a voltage retention value $V_{120}$ of at least $0.8V_0$, where $V_{120}$ is the absolute value of the voltage potential measured 120 s after application of the charging voltage potential.

In another embodiment, the invention provides a reactor wall coating according to any of the preceding embodiments, and wherein the coating has an initial voltage potential $V_0$, where $V_0$ is the absolute value of the voltage potential measured immediately after application of a charging voltage potential of 9 kV for a period of 20 ms, and a voltage retention value $V_{120}$ of at least $0.9V_0$, where $V_{120}$ is the absolute value of the voltage potential measured 120 s after application of the charging voltage potential.

In another embodiment, the invention provides a reactor wall coating according to any of the preceding embodiments, and wherein the coating has an initial voltage potential $V_0$, where $V_0$ is the absolute value of the voltage potential measured immediately after application of a charging voltage potential of 9 kV for a period of 20 ms, and a voltage retention value $V_{300}$ of at least $0.75V_0$, where $V_{300}$ is the absolute value of the voltage potential measured 300 s after application of the charging voltage potential.

In another embodiment, the invention provides a reactor wall coating according to any of the preceding embodiments, and wherein the coating has an initial voltage potential $V_0$, where $V_0$ is the absolute value of the voltage potential measured immediately after application of a charging voltage potential of 9 kV for a period of 20 ms, and a voltage retention value $V_{300}$ of at least $0.80V_0$, where $V_{300}$ is the absolute value of the voltage potential measured 300 s after application of the charging voltage potential.

In another embodiment, the present invention provides a reactor wall coating according to any of the preceding embodiments, and wherein the molecular weight distribution includes a major lower molecular weight peak and a minor higher molecular weight peak.

In another embodiment, the present invention provides a reactor wall coating according to any of the preceding embodiments, and wherein the major peak contains at least 50 wt % of the total weight of the molecular weight distribution.

In another embodiment, the present invention provides a reactor wall coating according to any of the preceding embodiments, and wherein the major peak contains at least 60 wt % of the total weight of the molecular weight distribution.

In another embodiment, the present invention provides a reactor wall coating according to any of the preceding embodiments, and wherein the major peak contains at least 70 wt % of the total weight of the molecular weight distribution.

In another embodiment, the invention provides a process for forming a coating on a reactor wall in a fluidized bed reactor. The process includes polymerizing olefin monomer in the reactor in the presence of bimetallic catalyst and an aluminum alkyl cocatalyst to form a reactor wall coating having a thickness of at least 100 μm, wherein the bimetallic catalyst includes a non-metallocene transition metal compound and a metallocene compound on an inorganic oxide support.

In another embodiment, the invention provides a process for forming a coating "in situ" on a reactor wall of a fluidized bed reactor during polymerization, without the need to remove any previously existing coating on the reactor wall. The process is carried out by providing a fluidized bed reactor including a reaction vessel having an interior reactor wall; polymerizing olefin monomer in the reactor in the presence of bimetallic catalyst and an aluminum alkyl cocatalyst to form a reactor wall coating on the interior reactor wall, the coating having a thickness of at least 100 μm, wherein the bimetallic catalyst includes a non-metallocene transition metal compound and a metallocene compound on an inorganic oxide support; and recovering polymerized olefin.

In any of the process embodiments, the reactor wall coating can be any of the reactor wall coatings described herein.

6. DETAILED DESCRIPTION

6.1 Reactors

The invention provides reactor wall coatings, and processes for producing reactor wall coatings, for reactors such as fluidized bed reactors and slurry loop reactors.

In fluidized-bed polymerization, the polymerization is conducted in a fluidized-bed reactor, wherein a bed of polymer particles is maintained in a fluidized state by means of an ascending gas stream including gaseous reaction monomer. The polymerization of olefins in a stirred-bed reactor differs from polymerization in a gas fluidized-bed reactor by the action of a mechanical stirrer within the reaction zone, which contributes to fluidization of the bed. As used herein, the term "fluidized-bed" also includes stirred-bed processes and reactors.

The start-up of a fluidized bed reactor generally uses a bed of pre-formed polymer particles. During the course of polymerization, fresh polymer is generated by the catalytic polymerization of the monomer, and polymer product is withdrawn to maintain the bed at constant volume. An industrially favored process employs a fluidization grid to distribute the fluidizing gas to the bed, and also to act as a support for the bed when the supply of gas is cut off. The polymer produced is generally withdrawn from the reactor via one or more discharge conduits disposed in the lower portion of the reactor, near the fluidization grid.

The fluidized bed includes a bed of growing polymer particles, polymer product particles and catalyst particles. This reaction mixture is maintained in a fluidized condition by the continuous upward flow from the base of the reactor of a fluidizing gas which includes recycle gas drawn from the top of the reactor, together with added make-up monomer.

The fluidizing gas enters the bottom of the reactor and is passed, preferably through a fluidization grid, upwardly through the fluidized bed.

The polymerization of olefins is an exothermic reaction, and it is therefore necessary to cool the bed to remove the heat of polymerization. In the absence of such cooling, the bed would increase in temperature until, for example, the catalyst became inactive or the polymer particles melted and began to fuse.

In the fluidized-bed polymerization of olefins, a typical method for removing the heat of polymerization is by passing a cooling gas, such as the fluidizing gas, which is at a temperature lower than the desired polymerization temperature, through the fluidized-bed to conduct away the heat of polymerization. The gas is removed from the reactor, cooled by passage through an external heat exchanger and then recycled to the bed.

The temperature of the recycle gas can be adjusted in the heat exchanger to maintain the fluidized-bed at the desired polymerization temperature. In this method of polymerizing alpha olefins, the recycle gas generally includes one or more monomeric olefins, optionally together with, for example, an inert diluent gas or a gaseous chain transfer agent such as hydrogen. The recycle gas thus serves to supply monomer to the bed to fluidize the bed and to maintain the bed within a desired temperature range. Monomers consumed by conversion into polymer in the course of the polymerization reaction are normally replaced by adding make-up monomer to the recycle gas stream.

The material exiting the reactor includes the polyolefin and a recycle stream containing unreacted monomer gases. Following polymerization, the polymer is recovered. If desired, the recycle stream can be compressed and cooled, and mixed with feed components, whereupon a gas phase and a liquid phase are then returned to the reactor.

The polymerization process can use Ziegler-Natta and/or metallocene catalysts. A variety of gas phase polymerization processes are known. For example, the recycle stream can be cooled to a temperature below the dew point, resulting in condensing a portion of the recycle stream, as described in U.S. Pat. Nos. 4,543,399 and 4,588,790. This intentional introduction of a liquid into a recycle stream or reactor during the process is referred to generally as a "condensed mode" operation.

Further details of fluidized bed reactors and their operation are disclosed in, for example, U.S. Pat. Nos. 4.243,619, 4,543,399, 5,352,749, 5,436,304, 5,405,922, 5,462,999, and 6,218,484, the disclosures of which are incorporated herein by reference.

A slurry loop polymerization reactor can generally be described as a loop-shaped continuous tube. In some instances, the reactor design may be generally "O" shaped. One or more fluid circulating devices, such as an axial pump, urge the reactor constituents within the tube in a desired direction so as to create a circulating current or flow of the reactor constituents within the tube. Desirably, the fluid circulating devices are designed to provide high velocity of motion and a very intensive and well-defined mixing pattern of the reactor constituents. The reactor may be totally or partially jacketed with cooling water in order to remove heat generated by polymer polymerization.

In a slurry loop reactor, the polymerization medium includes monomer, optional comonomer, and a hydrocarbon solvent or diluent, advantageously aliphatic paraffin such as propane, isobutane, hexane, heptane, or cyclohexane, for example, or an aromatic diluent such as toluene, or mixtures thereof. The polymerization is typically carried out at a temperature of from about 50 to 150° C., and a pressures of from 100 to about 700 psia (0.69–4.8 MPa). As such, the reactor constituents generally are a combination of both solids, such as supported catalyst and polymerized olefin, and liquids, such as those described above. The percentage of solids within the reactor constituents may be as high as 60 wt % of the reactor constituents. Typically, the weight percent of solids is in the range of 45 to 55 wt %.

The slurry loop polymerization reactor may be operated in a single stage process or in multistage processes. In multistage processing, the polymerization is carried out in two or more reactors. These reactors can be configured in series, in parallel, or a combination thereof.

Further details of slurry loop reactors and their operation are disclosed in, for example, U.S. Pat. Nos. 4,182,810, 5,274,056, 6,281,300, 3,380,325 and 6,319,997, and PCT publication WO 94/21962, the disclosures of which are incorporated herein by reference.

6.2 Catalysts

Certain embodiments of the invention make use of bimetallic catalysts. As used herein, the term "bimetallic catalyst" is a catalyst including a non-metallocene transition metal compound and a metallocene compound supported on an inorganic oxide support. Specific examples of such bimetallic catalysts and methods of their preparation include, for example, those disclosed in U.S. Pat. Nos. 5,525,678; 5,882,750; 6,410,474; and 6,417,130; and in PCT publication WO 97/17136. Preferably, the non-metallocene transition metal compound and the metallocene compound are provided on the same support; i.e., each support particle includes both a non-metallocene transition metal compound and a metallocene compound.

Suitable non-metallocene transition metal compounds are compounds of Group 4 or 5 metals, particularly those that are soluble in non-polar hydrocarbons. Suitable non-metallocene transition metal compounds include, for example, titanium and vanadium halides, oxyhalides or alkoxyhalides, such as titanium tetrachloride (TiCl$_4$), vanadium tetrachloride (VCl$_4$) and vanadium oxytrichloride (VOCl$_3$), and titanium and vanadium alkoxides, wherein the alkoxide moiety has a branched or unbranched alkyl group of 1 to 20 carbon atoms, preferably 1 to 6 carbon atoms. Mixtures of such transition metal compounds may also be used.

The term "metallocene compound" as used herein means compounds having a Group 4, 5 or 6 transition metal (M), with a cyclopentadienyl (Cp) ligand or ligands which may be substituted, at least one non-cyclopentadienyl-derived ligand (X), and zero or one heteroatom-containing ligand (Y), the ligands being coordinated to M and corresponding in number to the valence thereof. The metallocene catalyst precursors generally require activation with a suitable co-catalyst (referred to as an "activator"), in order to yield an active metallocene catalyst, i.e., an organometallic complex with a vacant coordination site that can coordinate, insert, and polymerize olefins. The metallocene compound is a compound of one or both of the following types:

Cyclopentadienyl (Cp) complexes which have two Cp ring systems for ligands. The Cp ligands form a sandwich complex with the metal and can be free to rotate (unbridged) or locked into a rigid configuration through a bridging group. The Cp ring ligands can be like or unlike, unsubstituted, substituted, or a derivative thereof, such as a heterocyclic ring system which may be substituted, and the substitutions can be fused to form other saturated or unsaturated rings systems such as tetrahydroindenyl, indenyl, or fluorenyl ring systems. These cyclopentadienyl complexes have the general formula $$(Cp^1R^1_m)R^3_n(Cp^2R^2_p)MX_q$$

wherein: $Cp^1$ and $Cp^2$ are the same or different cyclopentadienyl rings; $R^1$ and $R^2$ are each, independently, a halogen or a hydrocarbyl, halocarbyl, hydrocarbyl-substituted organometalloid or halocarbyl-substituted organometalloid group containing up to about 20 carbon atoms; m is 0 to 5; p is 0 to 5; two $R^1$ and/or $R^2$ substituents on adjacent carbon atoms of the cyclopentadienyl ring associated therewith can be joined together to form a ring containing from 4 to about 20 carbon atoms; $R^3$ is a bridging group; n is the number of atoms in the direct chain between the two ligands and is 0 to 8, preferably 0 to 3; M is a transition metal having a valence of from 3 to 6, preferably from group 4, 5, or 6 of the periodic table of the elements and is preferably in its highest oxidation state; each X is a non-cyclopentadienyl ligand and is, independently, a hydrogen, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; and q is equal to the valence of M minus 2.

(2) Monocyclopentadienyl complexes which have only one Cp ring system as a ligand. The Cp ligand forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from Group 15 or a coordination number of two from group 16 of the periodic table of the elements. These mono-cyclopentadienyl complexes have the general formula $$(Cp^1R^1_m)R^3_n(Y_rR^2)MX_s$$

wherein: each $R^1$ is independently, a halogen or a hydrocarbyl, halocarbyl, hydrocarbyl-substituted organometalloid or halocarbyl-substituted organometalloid group containing up to about 20 carbon atoms, "m" is 0 to 5, and two $R^1$ substituents on adjacent carbon atoms of the cyclopentadienyl ring associated there with can be joined together to form a ring containing from 4 to about 20 carbon atoms; $R^3$ is a bridging group; "n" is 0 to 3; M is a transition metal having a valence of from 3 to 6, preferably from group 4, 5, or 6 of the periodic table of the elements and is preferably in its highest oxidation state; Y is a heteroatom containing group in which the heteroatom is an element with a coordination number of three from Group 15 or a coordination number of two from group 16, preferably nitrogen, phosphorous, oxygen, or sulfur; $R^2$ is a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and when Y is three coordinate and unbridged there may be two $R^2$ groups on Y each independently a radical selected from the group consisting of $C_1$ to $C_{20}$ hydrocarbon radicals, substituted $C_1$ to $C_{20}$ hydrocarbon radicals, wherein one or more hydrogen atoms is replaced with a halogen atom, and each X is a non-cyclopentadienyl ligand and is, independently, a hydrogen, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, "s" is equal to the valence of M minus 2.

Examples of biscyclopentadienyl metallocenes of the type described in group (1) above for producing the mVLDPE polymers of the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614.

Illustrative, but not limiting, examples of suitable biscyclopentadienyl metallocenes of the type described in group (1) above are the racemic isomers of:

$\mu$-(CH$_3$)$_2$Si(indenyl)$_2$M(Cl)$_2$;
$\mu$-(CH$_3$)$_2$Si(indenyl)$_2$M(CH$_3$)$_2$;
$\mu$-(CH$_3$)$_2$Si(tetrahydroindenyl)$_2$M(Cl)$_2$;
$\mu$-(CH$_3$)$_2$Si(tetrahydroindenyl)$_2$M(CH$_3$)$_2$;
$\mu$-(CH$_3$)$_2$Si(indenyl)$_2$M(CH$_2$CH$_3$)$_2$; and
$\mu$-(C$_6$H$_5$)$_2$C(indenyl)$_2$M(CH$_3$)$_2$;
wherein M is Zr or Hf.

Examples of suitable unsymmetrical cyclopentadienyl metallocenes of the type described in group (1) above are disclosed in U.S. Pat. Nos. 4,892,851; 5,334,677; 5,416,228; and 5,449,651; and in the publication *J. Am. Chem. Soc.* 1988, 110, 6255.

Illustrative, but not limiting, examples of unsymmetrical cyclopentadienyl metallocenes of the type described in group (1) above are:

$\mu$-(C$_6$H$_5$)$_2$C(cyclopentadienyl)(fluorenyl)M(R)$_2$;
$\mu$-(C$_6$H$_5$)$_2$C(3-methylcyclopentadienyl)(fluorenyl)M(R)$_2$;
$\mu$-(CH$_3$)$_2$C(cyclopentadienyl)(fluorenyl)M(R)$_2$;
$\mu$-(C$_6$H$_5$)$_2$C(cyclopentadienyl)(2-methylindenyl)M(CH$_3$)$_2$;
$\mu$-(C$_6$H$_5$)$_2$C(3-methylcyclopentadienyl)(2-methylindenyl)M(Cl)$_2$;
$\mu$-(C$_6$H$_5$)$_2$C(cyclopentadienyl)(2,7-dimethylfluorenyl)M(R)$_2$; and
$\mu$-(CH$_3$)$_2$C(cyclopentadienyl)(2,7-dimethylfluorenyl)M(R)$_2$;
wherein M is Zr or Hf, and R is Cl or CH$_3$.

Examples of suitable monocyclopentadienyl metallocenes of the type described in group (2) above are disclosed in U.S. Pat. Nos. 5,026,798; 5,057,475; 5,350,723; 5,264,405; 5,055,438; and in WO 96/002244.

Illustrative, but not limiting, examples of monocyclopentadienyl metallocenes of the type described in group (2) above are:

$\mu$-(CH$_3$)$_2$Si(cyclopentadienyl)(1-adamantylamido)M(R)$_2$;
$\mu$-(CH$_3$)$_2$Si(3-tertbutylcyclopentadienyl)(1-adamantylamido)M(R)$_2$;
$\mu$-(CH$_2$(tetramethylcyclopentadienyl)(1-adamantylamido)M(R)$_2$;
$\mu$-(CH$_3$)$_2$Si(tetramethylcyclopentadienyl)(1-adamantylamido)M(R)$_2$;
$\mu$-(CH$_3$)$_2$C(tetramethylcyclopentadienyl)(1-adamantylamido)M(R)$_2$;
$\mu$-(CH$_3$)$_2$Si(tetramethylcyclopentadienyl)(1-tertbutylamido)M(R)$_2$;
$\mu$-(CH$_3$)$_2$Si(fluorenyl)(1-tertbutylamido)M(R)$_2$;
$\mu$-(CH$_3$)$_2$Si(tetramethylcyclopentadienyl)(1-cyclododecylamido)M(R)$_2$; and
$\mu$-(C$_6$H$_5$)$_2$C(tetramethylcyclopentadienyl)(1-cyclododecylamido)M(R)$_2$;
wherein M is Ti, Zr or Hf, and R is Cl or CH$_3$.

Other organometallic complexes that are useful catalysts are those with diimido ligand systems, such as are described in WO 96/23010. Other references describing suitable organometallic complexes include *Organometallics*, 1999, 2046; PCT publications WO 99/14250, WO 98/50392, WO 98/41529, WO 98/40420, WO 98/40374, WO 98/47933; and European publications EP 0 881 233 and EP 0 890 581.

In particular embodiments, the metallocene compound is a bis(cyclopentadienyl)metal dihalide, a bis(cyclopentadienyl)metal hydridohalide, a bis(cyclopentadienyl)metal monoalkyl monohalide, a bis(cyclopentadienyl) metal dialkyl, or a bis(indenyl)metal dihalides, wherein the metal is zirconium or hafnium, halide groups are preferably chlorine, and the alkyl groups are $C_1$–$C_6$ alkyls. Illustrative, but non-limiting examples of such metallocenes include:

bis(indenyl)zirconium dichloride;
bis(indenyl)zirconium dibromide;
bis(indenyl)zirconium bis(p-toluenesulfonate);
bis(4,5,6,7-tetrahydroindenyl)zirconium dichloride;
bis(fluorenyl)zirconium dichloride;
ethylene-bis(indenyl)zirconium dichloride;
ethylene-bis(indenyl)zirconium dibromide;
ethylene-bis(indenyl)dimethyl zirconium;
ethylene-bis(indenyl)diphenyl zirconium;
ethylene-bis(indenyl)methyl zirconium monochloride;
ethylene-bis(indenyl)zirconium bis(methanesulfonate);
ethylene-bis(indenyl)zirconium bis(p-toluenesulfonate);
ethylene-bis(indenyl)zirconium bis(trifluoromethanesulfonate);
ethylene-bis(4,5,6,7-tetrahydroindenyl)zirconium dichloride;
isopropylidene(cyclopentadienyl-fluorenyl)zirconium dichloride;
isopropylidene(cyclopentadienyl-methylcyclopentadienyl) zirconium dichloride;
dimethylsilyl-bis(cyclopentadienyl)zirconium dichloride;
dimethylsilyl-bis(methylcyclopentadienyl)zirconium dichloride;
dimethylsilyl-bis(dimethylcyclopentadienyl)zirconium dichloride;
dimethylsilyl-bis(trimethylcyclopentadienyl)zirconium dichloride;
dimethylsilyl-bis(indenyl)zirconium dichloride;
dimethylsilyl-bis(indenyl)zirconium bis(trifluoromethanesulfonate);
dimethylsilyl-bis(4,5,6,7-tetrahydroindenyl)zirconium dichloride;
dimethylsilyl(cyclopentadienyl-fluorenyl)zirconium dichloride;
diphenylsilyl-bis(indenyl)zirconium dichloride;
methylphenylsilyl-bis(indenyl)zirconium dichloride;
bis(cyclopentadienyl)zirconium dichloride;
bis(cyclopentadienyl)zirconium dibromide;
bis(cyclopentadienyl)methylzirconium monochloride;
bis(cyclopentadienyl)ethylzirconium monochloride;
bis(cyclopentadienyl)cyclohexylzirconium monochloride;
bis(cyclopentadienyl)phenylzirconium monochloride;
bis(cyclopentadienyl)benzylzirconium monochloride;
bis(cyclopentadienyl)zirconium monochloride monohydride;
bis(cyclopentadienyl)methylzirconium monohydride;
bis(cyclopentadienyl)dimethylzirconium;

bis(cyclopentadienyl)diphenylzirconium;
bis(cyclopentadienyl)dibenzylzirconium;
bis(cyclopentadienyl)methyoxyzirconium chloride;
bis(cyclopentadienyl)ethoxyzirconium chloride;
bis(cyclopentadienyl)zirconium bis(methanesulfonate);
bis(cyclopentadienyl)zirconium bis(p-toluenesulfonate);
bis(cyclopentadienyl)zirconium bis (trifluoromethanesulfonate);
bis(methylcyclopentadienyl)zirconium dichloride;
bis(dimethylcyclopentadienyl)zirconium dichloride;
bis(dimethylcyclopentadienyl)ethoxyzirconium chloride;
bis(dimethylcyclopentadienyl)zirconium bis (trifluoromethanesulfonate);
bis(ethylcyclopentadienyl)zirconium dichloride;
bis(methylethylcyclopentadienyl)zirconium dichloride;
bis(propylcyclopentadienyl)zirconium dichloride;
bis(methylpropylcyclopentadienyl)zirconium dichloride;
bis(butylcyclopentadienyl)zirconium dichloride;
bis(methylbutylcyclopentadienyl)zirconium dichloride;
bis(methylbutylcyclopentadienyl)zirconium bis (methanesulfonate);
bis(trimethylcyclopentadienyl)zirconium dichloride;
bis(tetramethylcyclopentadienyl)zirconium dichloride;
bis(pentamethylcyclopentadienyl)zirconium dichloride;
bis(hexylcyclopentadienyl)zirconium dichloride;
bis(trimethylsilylcyclopentadienyl)zirconium dichloride;
bis(cyclopentadienyl)zirconium dichloride;
bis(cyclopentadienyl)hafnium dichloride;
bis(cyclopentadienyl)zirconium dimethyl;
bis(cyclopentadienyl)hafnium dimethyl;
bis(cyclopentadienyl)zirconium hydridochloride;
bis(cyclopentadienyl)hafnium hydridochloride;
bis(n-butylcyclopentadienyl)zirconium dichloride;
bis(n-butylcyclopentadienyl)hafnium dichloride;
bis(n-butylcyclopentadienyl)zirconium dimethyl;
bis(n-butylcyclopentadienyl)hafnium dimethyl;
bis(n-butylcyclopentadienyl)zirconium hydridochloride;
bis(n-butylcyclopentadienyl)hafnium hydridochloride;
bis(pentamethylcyclopentadienyl)zirconium dichloride;
bis(pentamethylcyclopentadienyl)hafnium dichloride;
bis(n-butylcyclopentadienyl)zirconium dichloride;
cyclopentadienylzirconium trichloride;
bis(indenyl)zirconium dichloride;
bis(4,5,6,7-tetrahydro-1-indenyl)zirconium dichloride; and
ethylene-[bis(4,5,6,7-tetrahydro-1-indenyl)] zirconium dichloride.

The inorganic oxide support can be a solid, particulate, porous, inorganic material, such as an oxide of silicon and/or of aluminum. The support material is used in the form of a dry powder having an average particle size of from about 1–500 µm, typically from about 10–250 µm. The surface area of the support is at least about 3 m$^2$/g, and typically much larger, such as 50–600 m$^2$/g or more. Various grades of silica and alumina support materials are widely available from numerous commercial sources.

In a particular embodiment, the carrier is silica. A suitable silica is a high surface area, amorphous silica, such as a material marketed under the tradenames of Davison 952 or Davison 955 by the Davison Chemical Division of W. R. Grace and Company. These silicas are in the form of spherical particles obtained by a spray-drying process, and have a surface area of about 300 m$^2$/g, and a pore volume of about 1.65 cm$^3$/g. It is well known to dehydrate silica by fluidizing it with nitrogen and heating, such as described, for example, in U.S. Pat. No. 5,525,678. The silica can be dehydrated at a temperature of from 400 C to 1000 C, typically from about 600 to 900 C.

6.3 Processes

In contrast to conventional chromocene reactor treatment, the processes of the invention allow the formation of reactor wall coatings without the need to shut down the reactor, sandblast the surface, treat with chromocene and ethylene, and shut down the reactor again to clean debris. As noted above, such processes require reactor downtime of, typically, 8–14 days, during which production of polymer product is halted. While the processes of the present invention can be carried out on clean (coating-free) reactor surfaces, they can also be carried out on reactor surfaces with existing coatings. Thus, a commercial reactor running metallocene catalysts, Ziegler-Natta catalysts, or chromium catalysts, for example, can be coated with a reactor wall coating of the invention by simply changing the catalyst system to the bimetallic catalysts described herein, without the need for costly downtime for sandblasting, etc. Further, during the process of formation of the reactor wall coating, the reactor produces high quality bimodal polyolefin resin at normal capacity. When the reactor wall has a pre-existing coating, the pre-existing coating will typically be at a thickness of less than 100 µm or less than 50 µm or less than 20 µm or less than 10 µm.

In one embodiment, the process is carried out by polymerizing olefin monomer in the reactor in the presence of bimetallic catalyst and an aluminum alkyl cocatalyst to form a reactor wall coating having a thickness of at least 100 µm, wherein the bimetallic catalyst includes a non-metallocene transition metal compound and a metallocene compound on an inorganic oxide support.

Suitable olefin monomers include ethylene, propylene, and α-olefins, such as $C_4$–$C_{20}$ α-olefins or $C_4$–$C_{12}$ α-olefins. The α-olefin can be linear or branched, and two or more monomers can be used, if desired. Examples of suitable monomers include ethylene, propylene, linear $C_4$–$C_{12}$ α-olefins, and α-olefins having one or more $C_1$–$C_3$ alkyl branches, or an aryl group. Further specific examples include: 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene.

In some embodiments, the process is effective to form a reactor wall coating at a rate of at least 25 µm/day or at least 30 µm/day or at least 34 µm/day, where the rate per day is an average rate preferably averaged over a period of 5 days.

As noted above, the process can be carried out with or without removing from the interior reactor wall a previously applied wall coating, as desired.

Polymerization is conducted in the presence of a trialkyl aluminum cocatalyst. The trialkylaluminum cocatalyst can be a compound of empirical formula $AlR_3$, wherein each R group is independently an alkyl group containing 1 to 10 carbon atoms, such as methyl, ethyl, propyl, isopropyl, butyl, isobutyl, pentyl, isopentyl, hexyl, isohexyl, heptyl, isoheptyl, octyl, or isooctyl. A particular example of a suitable cocatalyst is trimethylaluminum (TMA). The trialkyl aluminum cocatalyst is used in an amount of from a lower limit of 1 or 5 or 10 or 20 or 50 ppm by weight to an upper limit of 1000 or 500 or 300 or 200 ppm by weight, based on the total weight of alpha olefin monomer, with ranges from any lower limit to any upper limit being contemplated.

Optionally, the polymerization can take place in the presence of water. Thus, water can be used in an amount of from a lower limit of 0 or 1 or 5 or 10 ppm by weight to an upper limit of 1000 or 500 or 100 or 50 or 20 ppm by weight, based on the total weight of alpha olefin monomer, with ranges from any lower limit to any upper limit being contemplated.

In any of the process embodiments, the reactor wall coating can be any of the inventive reactor wall coatings described herein.

6.4 Reactor Wall Coatings

The reactor wall coatings are disposed on the interior surface of a reaction vessel, such as in a fluidized bed or slurry loop polymerization reactor, and can be formed by any of the processes described above.

The data shown in FIGS. 1–4 are described more fully in the Examples section herein.

Figure 1:
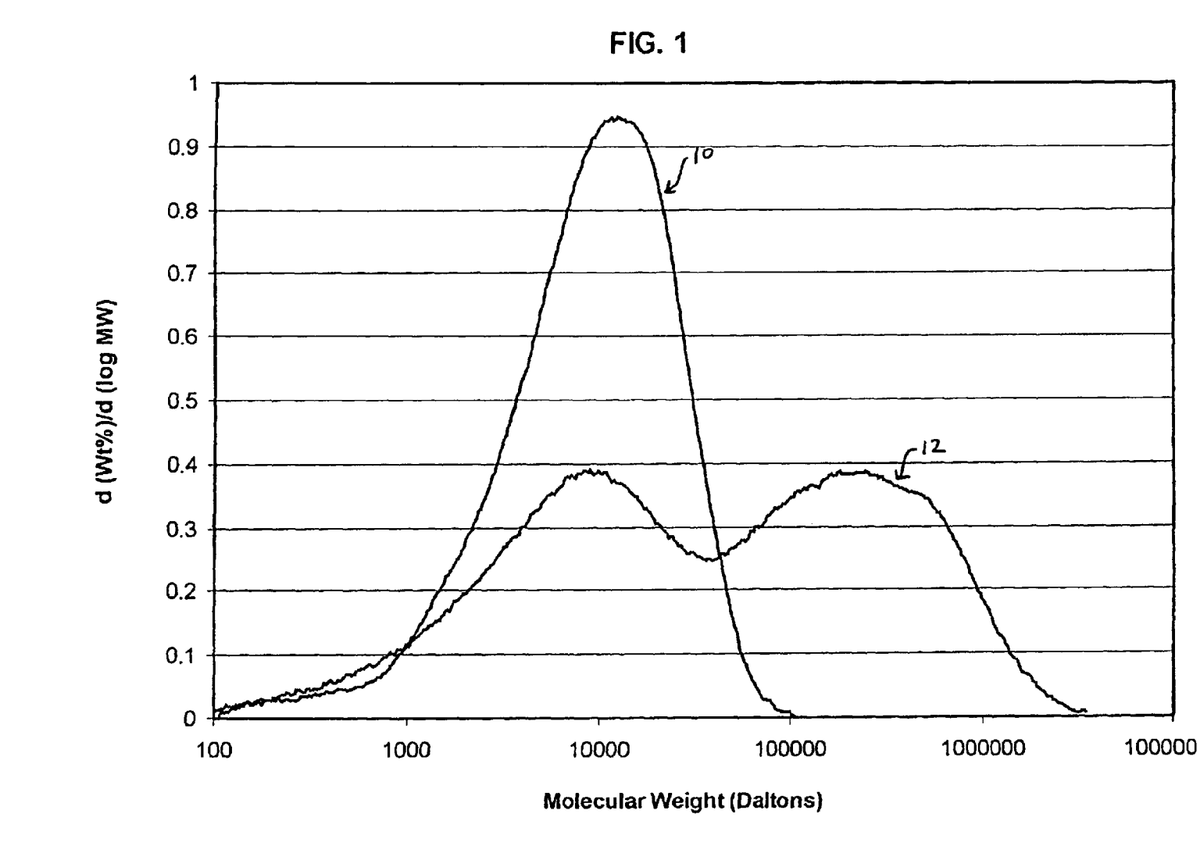
FIG. 1 shows molecular weight distribution functions for a reactor wall coating of the invention and a conventional reactor wall coating.

Referring now to FIG. 1, molecular weight distributions are shown in the form of a plot of the derivative (d) of weight percent with respect to the base ten logarithm (log) of molecular weight (MW), d(wt %)/d(log MW). Weight percents as a function of molecular weight are determined by gel permeation chromatography, a well-known technique described in more detail in the Examples. Curve 10 shows the molecular weight distribution function for a reactor wall coating of the invention formed on a metal foil sample placed above the distributor plate of a fluidized bed reactor, and curve 12 shows the molecular weight distribution function of the wall coating of a commercial reactor treated with a conventional chromocene coating process. As the Figure shows, the inventive reactor wall coating has a narrow, major peak at a relatively low molecular weight, whereas the conventional chromocene coating has a very broad, multimodal distribution, with a poorly defined maximum at a relatively higher molecular weight.

Figure 2:
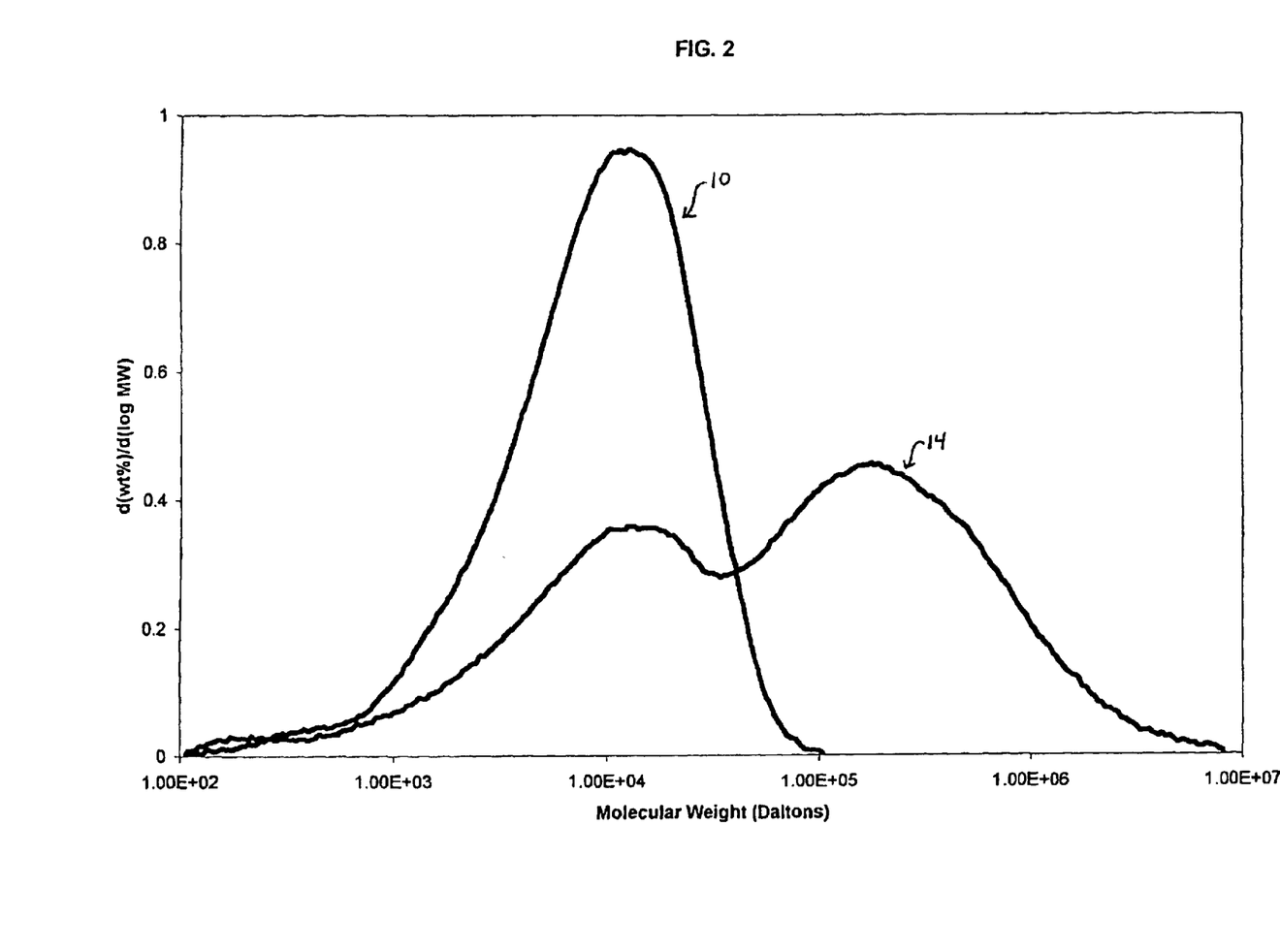
FIG. 2 shows molecular weight distribution functions for a reactor wall coating of the invention and a bimodal polyethylene resin.

Referring now to FIG. 2, curve 10 is as described above, and curve 12 shows the molecular weight distribution function of the polyethylene resin produced in the same polymerization process as the reactor wall coating; i.e., using the same bimetallic catalyst and essentially the same polymerization conditions. As the Figure shows, the reactor wall coating is not simply a coating of the polymer produced in the reactor, but is a narrow, essentially monomodal distribution peaking at a slightly lower molecular weight than the lower molecular weight component of the bimodal resin distribution.

Figure 3:
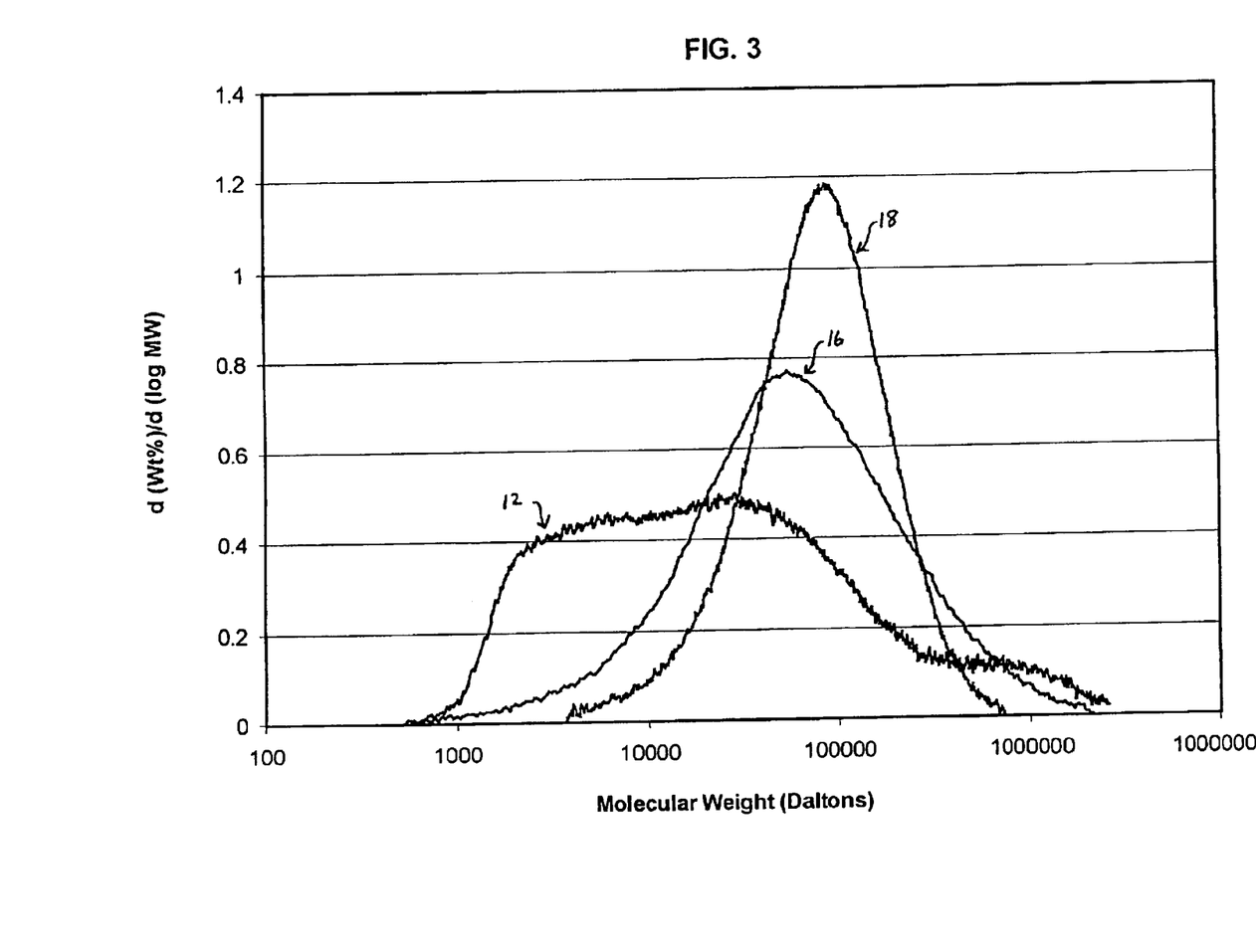
FIG. 3 shows molecular weight distribution functions for two conventional reactor wall coatings and a metallocene-catalyzed polyethylene resin.

Referring now to FIG. 3, the molecular weight distribution function for the conventional chromocene coating as described in connection with FIG. 2 is reproduced (curve 12). Curve 16 shows the molecular weight distribution function of the wall coating on a commercial fluidized be reactor not treated with either the inventive wall coating or a conventional chromocene coating. The commercial reactor runs Ziegler-Natta and metallocene catalyzed polymerizations. Curve 18 shows the molecular weight distribution function of a metallocene-catalyzed linear low density polyethylene copolymer resin. As the Figure shows in conjunction with FIG. 1 or 2, the inventive reactor wall coating is narrower than chromocene or untreated reactor wall coatings, and shifted to much lower molecular weights.

Figure 4:
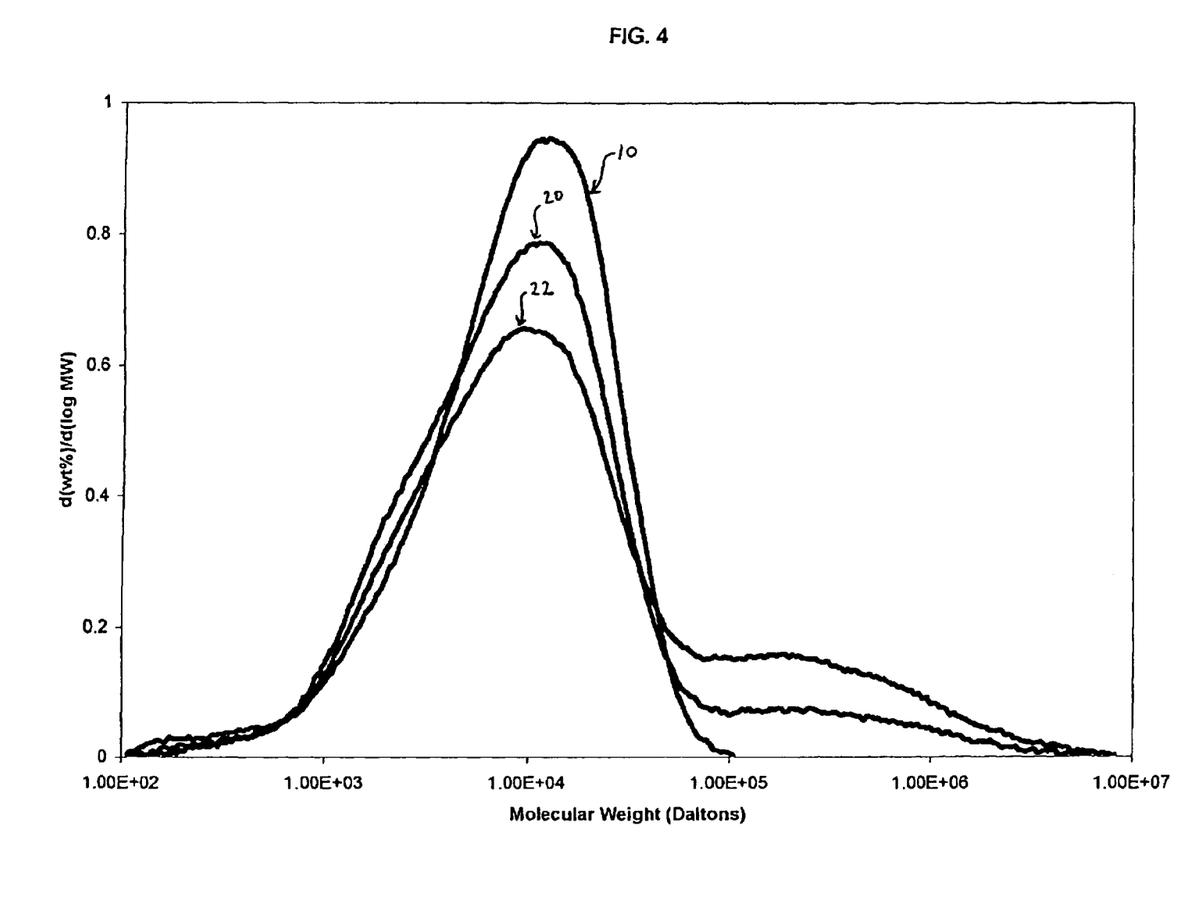
FIG. 4 shows molecular weight distribution functions for several reactor wall coatings of the invention.

Referring now to FIG. 4, curve 10 is as described above, for an inventive reactor wall coating formed on a metal foil sample substrate in a fluidized bed reactor. Curves 20 and 22 are molecular weight distribution functions of reactor wall coatings taken from two sample points in a commercial fluidized bed reactor after 5 days of polymerization with the bimetallic catalysts as described herein. The Figure shows that the reactor coating produced on the foil substrate is in fact representative of the reactor coating formed on the wall in a fluidized bed reactor. Curves 20 and 22 also include a high molecular weight tail, resulting in a distribution that appears bimodal. In contrast to conventional chromocene reactor wall coatings, however, the distribution is dominated by the narrow major peak at low molecular weight. The reactor wall sampled to provide curves 20 and 22 was not subjected to the cleaning required when applying a conventional chromocene treatment; i.e., while the wall was cleaned of fines and debris, it was not sand-blasted to remove the pre-existing coating prior to being coated in accordance with the invention. The Figure shows that it is unnecessary in the processes of the invention to remove pre-existing coatings to achieve the inventive wall coating as shown by the narrow, major low molecular weight peaks.

The inventive reactor wall coatings can be characterized by one or more of the following parameters.

The thickness of the reactor wall coating can be at least 100 $\mu$m or at least 125 $\mu$m or at least 150 $\mu$m or at least 170 $\mu$m. The thickness of the reactor wall will generally be less than 3000 $\mu$m or less than 2500 $\mu$m or less than 2000 $\mu$m, with ranges from any lower limit to any upper limit being contemplated.

The reactor wall coating has a molecular weight distribution function including a major peak, where "major peak" denotes the peak having the highest value of d(wt %)/d(log MW). As FIG. 4 shows, the distribution can be essentially monomodal, as shown in curve 10 (neglecting the small, very low molecular weight shoulder), or can include a minor, higher molecular weight peak or shoulder as shown by curves 20 and 22.

The major peak has at least one of:
(a) an Mw/Mn ratio of less than 10, or less than 8 or less than 6 or less than 4;
(b) an Mz/Mw ratio of less than 7, or less than 6 or less than 5 or less than 4; and
(c) a maximum value of d(wt %)/d(log MW) at less than 25,000 or less than 20,000 or less than 15,000 or less than 13,000 daltons in a plot of d(wt %)/d(log MW), where MW is the molecular weight in daltons.

In particular embodiments, the major peak can have any two of (a)–(c) or all three of (a)–(c).

In particular embodiments, the major peak has an Mn value of less than 7000 or less than 6000.

In any of the embodiments wherein the molecular weight distribution function is bimodal, the values above describe the properties of the major peak. One skilled in the art can readily deconvolute the bimodal distribution into the sum of two monomodal distributions corresponding to the major low molecular weight peak and the minor high molecular weight peak, using a conventional least squares fit to two log normal distribution functions. Numerical methods for such deconvolutions are described, for example, in E. Broyer and R. F. Abbot, "Analysis of Molecular Weight Distribution," *Computer Applications in Applied Polymer Science*, ACS Symposium Series 197, p45 (1982).

The major peak can contain at least 50% or at least 60% or at least 70% of the total molecular weight represented by the molecular weight distribution function.

Secondary Ion Mass Spectrometry (SIMS) analysis of samples of the reactor wall coating showed that the coating does not contain detectable amounts of silicon, but does contain residual amounts of aluminum and zirconium throughout the thickness of the sample. Titanium was found near the surface of the coating and not distributed throughout the thickness of the sample.

The residual amount of aluminum can be less than 100,000 ppm, preferably less than 10,000 ppm.

Reactor wall coatings according to the invention surprisingly provide superior charge holding potential compared to conventional coatings. Charge holding potential can be measured as described in the Examples section herein. Useful measures of charge holding potential include the initial voltage difference held by the wall immediately after application of a standard voltage potential for a fixed period of time, and voltage potentials subsequently held at selected times.

In one embodiment, the reactor wall coating has an initial voltage potential $V_0$ of at least 400 V or at least 600 V or at least 800 V or at least 1000 V, where $V_0$ is the absolute value of the voltage potential measured immediately after application of a charging voltage potential of 9 kV for a period of 20 ms; i.e., at time t=0.

In another embodiment, the reactor wall coating has a voltage retention value $V_{60}$ of at least $0.8V_0$ or at least $0.9V_0$, where $V_{60}$ is the absolute value of the voltage potential measured 60 s after application of the charging voltage potential.

In another embodiment, the reactor wall coating has a voltage retention value $V_{120}$ of at least $0.75V_0$ or at least $0.8V_0$ or at least $0.9V_0$, where $V_{120}$ is the absolute value of the voltage potential measured 120 s after application of the charging voltage potential.

In another embodiment, the reactor wall coating has a voltage retention value $V_{300}$ of at least $0.75V_0$ or at least $0.8V_0$, where $V_{300}$ is the absolute value of the voltage potential measured 300 s after application of the charging voltage potential.

7. EXAMPLES

Mz, Mw and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyro gel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., *Polymer Molecular Weights Part II*, Marcel Dekker, Inc., NY, (1975) 287–368; Rodriguez, F., *Principles of Polymer Systems* 3rd ed., Hemisphere Pub. Corp., NY, (1989) 155–160; U.S. Pat. No. 4,540,753; Verstrate et al., *Macromolecules*, vol. 21, (1988) 3360; and references cited therein.

Molecular weights (Mw, Mn, Mz) and their ratios were determined for reactor wall coatings as described above, with the material analyzed obtained by scraping the coating from the foil substrates or from the reactor wall, as described below.

Reactor wall thickness was measured using a commercially available film thickness meter (DeFelsko Model 6000 coating thickness gauge). Reported values are generally averages of 4–5 measurements.

Charge decay characteristics, including initial voltage and voltage retention were measured using a charge decay meter available from John Chubb Instruments. The charge decay meter applies a corona discharge for a preselected period of time, and a preselected voltage potential, at a fixed distance, then measures the voltage potential on the reactor wall coating sample as a function of time. In measurements made on reactor walls, the charge decay characteristics were made directly on the reactor wall, in situ, at locations around the circumference of the reactor at a height of approximately 1.3 m above the distributor plate. In Examples 1–4 below, a voltage of –9 kV was applied for a period of 20 ms, whereas in Examples 5–9 the voltage was +9 kV.

Example numbers appended with a "C" are comparative examples.

Examples 1–4

In Example 1, a sample substrate was placed on top of the distributor plate of a pilot plant scale fluidized bed reactor. The sample substrate was a piece of iron metal foil from Goodfellow Corporation, with a purity of 99.5% and containing no nickel or chromium alloying agents. As such, it was representative of the reactor wall metal. The foil substrate was approximately 0.1 mm thick and approximately 25–50 mm diameter, and held in a ring-shaped clamp. The reactor was run for approximately 3 weeks in a conventional fluidized bed polymerization to produce ethylene copolymers, but using a bimetallic catalyst as described herein. The catalyst was a silica-supported bimetallic catalyst including a titanium Ziegler-Natta catalyst and an unbridged bis-cyclopentadienyl zirconium metallocene catalyst. At the end of the 3-week polymerization run, the sample was removed and its thickness and charge carrying characteristics measured. In addition, as described above, the coating on the sample was further characterized by SIMS.

Examples 2–4 are comparative. In Example 2C, the reactor wall coating in pilot plant reactor that had been used for polymerization using an unbridged bis-cyclopentadienyl zirconium metallocene catalyst was measured in-situ for reactor wall coating thickness and charge carrying characteristics. Example 3C was carried out as in Example 2C, except that the reactor had been used for polymerization with Ziegler-Natta catalysts. Example 4C was carried out on a wall coating from a commercial reactor that had been running, at various times, Ziegler-Natta and metallocene catalysts. The commercial reactor had been treated with a chromocene treatment several weeks before the sampling took place.

The results are shown in Table 1. In the Table, the subscript of V indicates the time in seconds after application of the standard charge.

TABLE 1

|  | 1 | 2C | 3C | 4C |
|---|---|---|---|---|
| Coating Thickness ($\mu$m) | 135 | 5 | 19 | 114 |
| $V_0$ (V)* | 728 | 92 | 77 | 330 |
| $V_0$ (%) | 100 | 100 | 100 | 100 |
| $V_{30}$ (%) | 98 | 0 | 4 | 82 |
| $V_{60}$ (%) | 97 | 0 | 0 | 76 |
| $V_{90}$ (%) | 97 | 0 | 0 | 74 |
| $V_{120}$ (%) | 97 | 0 | 0 | 74 |
| $V_{150}$ (%) | 97 | 0 | 0 | 74 |
| $V_{180}$ (%) | 97 | 0 | 0 | 74 |
| $V_{210}$ (%) | 97 | 0 | 0 | 74 |
| $V_{240}$ (%) | 97 | 0 | 0 | 74 |
| $V_{270}$ (%) | 97 | 0 | 0 | 74 |
| $V_{300}$ (%) | 97 | 0 | 0 | 74 |

*absolute value

Examples 5–9

In Examples 5 and 6, a commercial-scale fluidized bed reactor was used to form ethylene copolymers using a silica-supported bimetallic catalyst including a titanium Ziegler-Natta catalyst and an unbridged bis-cyclopentadienyl zirconium metallocene catalyst. The reactor had previously been used for several years using a variety of chromium catalysts. Chromium catalysts are well-known, and are described, for example, in U.S. Pat. No. 2,825,721. These catalysts are sometimes termed "Phillips catalysts." The preexisting reactor wall coating was not removed prior to polymerization with the bimetallic catalyst. The polymerization was run continuously for a period of 5 days, then the reactor was opened and the reactor wall coating measured in-situ at two locations around the reactor circumference, at a height of 1.3 m above the distributor plate. Examples 5 and 6 represent measurements at these two locations.

Examples 7C–9C used the same commercial reactor as in Example 5, except that the reactor wall coating was measured at two different times approximately 2 months (Examples 7C and 8C) and 4 months (Example 9C) prior to carrying out Examples 5 and 6. At the time of Examples 7C-9C, the reactor had been used continuously (except for routine maintenance shutdowns) for chromium catalyzed polymerization for several years.

The results are shown in Table 2.

In the Table, the subscript of V indicates the time in seconds after application of the standard charge.

TABLE 2

|  | 5 | 6 | 7C | 8C | 9C |
|---|---|---|---|---|---|
| Coating Thickness ($\mu$m) | 241 | 170 | 58 | 43 | 63 |
| $V_0$ (V)* | 1214 | 994 | 210 | 172 | 237 |
| $V_0$ (%) | 100 | 100 | 100 | 100 | 100 |
| $V_{30}$ (%) | 94 | 97 | 43 | 28 | 46 |
| $V_{60}$ (%) | 93 | 95 | 39 | 24 | 10 |
| $V_{90}$ (%) | 91 | 94 | 37 | 21 | 36 |
| $V_{120}$ (%) | 91 | 93 | 32 | 19 | 34 |
| $V_{150}$ (%) | 90 | 92 | 30 | 17 | 31 |
| $V_{180}$ (%) | 89 | 91 | 28 | 16 | 30 |
| $V_{210}$ (%) | 89 | 90 | 27 | 15 | 28 |
| $V_{240}$ (%) | 87 | 89 | 22 | 15 | 28 |
| $V_{270}$ (%) | 89 | 85 | 21 | 14 | 22 |
| $V_{300}$ (%) | 89 | 81 | 19 | 13 | 22 |

*absolute value

Examples 10–13

In Examples 10–13, samples of reactor wall coatings were taken by scraping the reactor wall or sample substrate surface. In Example 10, the sample from Example 1 was used. In Examples 11 and 12, the samples from Examples 5 and 6 were used. Example 13C is a comparative example, using a sample from a chromocene-treated commercial reactor wall (chromocene treatment about 7 months before sampling). The samples were analyzed for molecular weight distribution by gel permeation chromatography (GPC), and the resulting molecular weight distributions shown in the Figures as described above. For Examples 11 and 12, the data shown are calculated from a two-component log-normal least squares fit, and correspond to the major, lower molecular weight peak. The maximum value of d(wt %)/d (log MW), denoted $M_{peak}$ in the Table, was not determined for the chromocene sample 13C (curve 12 in FIG. 1), but is clearly much greater than for Examples 10–12 (see, e.g., curve 10 in FIG. 1).

The data are shown in Table 3.

TABLE 3

|  | 10 | 11 | 12 | 13C |
|---|---|---|---|---|
| Mn | 3779 | 4196 | 4777 | 7301 |
| $M_{peak}$* | 12,500 | 9500 | 11,300 |  |
| Mw/Mn | 3.45 | 3.31 | 3.12 | 14.95 |
| Mz/Mw | 1.82 | 3.32 | 3.13 | 7.42 |

*maximum value of d (wt %)/d (log MW)

All patents, test procedures, and other documents cited herein, including priority documents, are fully incorporated by reference to the extent such disclosure is not inconsistent with this invention and for all jurisdictions in which such incorporation is permitted.

What is claimed is:

1. A fluidized bed reactor having a reactor wall coating, wherein said reactor wall coating is formed in situ on a reactor wall during polymerization of olefin monomer, said reactor wall coating having a thickness of at least 100 $\mu$m and a molecular weight distribution comprising a major peak having:

(a) an Mw/Mn ratio of less than 10;
   (b) an Mz/Mw ratio of less than 7, and
   (c) a maximum value of d(wt %)/d(log MW) at less than 25,000 daltons in a plot of d(wt %)/d(log MW), where MW is the molecular weight in daltons, wherein said wall coating is formed in situ on a reactor wall during polymerization of olefin monomer in the presence of bimetallic catalyst and an aluminum alkyl cocatalyst to form a reactor wall coating on the interior reactor wall.

2. The reactor wall coating of claim 1, wherein the thickness is at least 125 $\mu$m.

3. The reactor wall coating of claim 1, wherein the thickness is at least 150 $\mu$m.

4. The reactor wall coating of claim 1, wherein the Mw/Mn ratio is less than 4.

5. The reactor wall coating of claim 1, wherein the Mz/Mw ratio is less than 4.

6. The reactor wall coating of claim 1, wherein the maximum value of d(wt %)/d(log MW) is at less than 15,000 daltons.

7. The reactor wall coating of claim 1, wherein the maximum value of d(wt %)/d(log MW) is at less than 13,000 daltons.

8. The reactor wall coating of claim 1, wherein the major peak has an Mn value of less than 7000.

9. The reactor wall coating of claim 1, wherein the coating has an initial voltage potential $V_0$ of at least 400 V, where $V_0$ is the absolute value of the voltage potential measured immediately after application of a charging voltage potential of 9 kV for a period of 20 ms.

10. The reactor wall coating of claim 9, wherein $V_0$ is at least 600 V.

11. The reactor wall coating of claim 9, wherein $V_0$ is at least 800 V.

12. The reactor wall coating of claim 9, wherein $V_0$ is at least 1000 V.

13. The reactor wall coating of claim 9, wherein the coating has a voltage retention value $V_{60}$ of at least $0.8V_0$, where $V_{60}$ is the absolute value of the voltage potential measured 60 s after application of the charging voltage potential.

14. The reactor wall coating of claim 13, wherein $V_{60}$ is at least $0.9V_0$.

15. The reactor wall coating of claim 9, wherein the coating has a voltage retention value $V_{120}$ of at least $0.75V_0$, where $V_{120}$ is the absolute value of the voltage potential measured 120 s after application of the charging voltage potential.

16. The reactor wall coating of claim 15, wherein $V_{120}$ is at least $0.8V_0$.

17. The reactor wall coating of claim 15, wherein $V_{120}$ is at least $0.9V_0$.

18. The reactor wall coating of claim 9, wherein the coating has a voltage retention value $V_{300}$ of at least $0.75V_0$, where $V_{300}$ is the absolute value of the voltage potential measured 300 s after application of the charging voltage potential.

19. The reactor wall coating of claim 18, wherein $V_{300}$ is at least 0.8V0.

20. The reactor wall coating of claim 1, wherein the major peak contains at least 50 wt % of the total weight of the molecular weight distribution.

21. The reactor wall coating of claim 1, wherein the major peak contains at least 60 wt % of the total weight of the molecular weight distribution.

22. The reactor wall coating of claim 1, wherein the major peak contains at least 70 wt % of the total weight of the molecular weight distribution.

23. A fluidized bed reactor having a reactor wall coating, wherein said reactor wall coating is formed in situ on a reactor wall during polymerization of olefin monomer, said reactor wall coating having a thickness of at least 100 μm and a molecular weight distribution comprising a major peak having:

(a) an Mw/Mn ratio of less than 10;
(b) an Mz/Mw ratio of less than 7, and
(c) a maximum value of d(wt %)/d(log MW) at less than 25,000 daltons in a plot of d(wt %)/d(log MW), where MW is the molecular weight in daltons wherein said olefin monomer comprises at least one monomer selected from the group consisting of ethylene, propylene, $C_4$–$C_{20}$ alpha olefins, and mixtures thereof.

24. A fluidized bed reactor having a reactor wall coating, wherein said reactor wall coating is formed in situ on a reactor wall during polymerization of olefin monomer, said reactor wall coating baying a thickness of at least 100 μm and a molecular weight distribution comprising a major peak having:

(a) an Mw/Mn ratio of less than 10;
(b) an Mz/Mw ratio of less than 7, and
(c) a maximum value of d(wt %)/d(log MW) at less than 25,000 daltons in a plot of d(wt %)/d(log MW), where MW is the molecular weight in daltons, wherein said coating comprises aluminum and zirconium.

* * * * *